United States Patent
Fendt

(10) Patent No.: US 10,752,173 B2
(45) Date of Patent: Aug. 25, 2020

(54) METHOD FOR PERFORMING A TOWING PROCESS, AND CAMERA SYSTEM FOR RECOGNIZING A TOWING PROCESS, AS WELL AS MOTOR VEHICLE WITH A CAMERA SYSTEM

(71) Applicant: Conti Temic microelectronic GmbH, Nuremberg (DE)

(72) Inventor: Guenter Anton Fendt, Schrobenhausen (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 0 days.

(21) Appl. No.: 16/519,394

(22) Filed: Jul. 23, 2019

(65) Prior Publication Data
US 2020/0047669 A1 Feb. 13, 2020

(30) Foreign Application Priority Data
Aug. 13, 2018 (DE) .......................... 10 2018 213 578

(51) Int. Cl.
| | | |
|---|---|---|
| *B60R 1/00* | (2006.01) | |
| *B60D 1/18* | (2006.01) | |
| *B60D 1/58* | (2006.01) | |
| *B60W 40/105* | (2012.01) | |

(52) U.S. Cl.
CPC .............. *B60R 1/00* (2013.01); *B60D 1/18* (2013.01); *B60D 1/58* (2013.01); *B60W 40/105* (2013.01); *B60R 2300/802* (2013.01); *B60R 2300/8066* (2013.01); *B60W 2554/80* (2020.02)

(58) Field of Classification Search
CPC ............... B60R 1/00; B60R 2300/802; B60R 2300/8066; B60D 1/18; B60D 1/58; B60W 40/105; B60W 2554/80
See application file for complete search history.

(56) References Cited

U.S. PATENT DOCUMENTS

| | | | |
|---|---|---|---|
| 10,272,917 B2 | 4/2019 | Bramson et al. | |
| 2016/0245659 A1* | 8/2016 | Ohba | G01C 21/3697 |
| 2018/0186377 A1* | 7/2018 | Bramson | B60L 58/12 |

(Continued)

FOREIGN PATENT DOCUMENTS

| | | |
|---|---|---|
| DE | 102006007732 | 8/2007 |
| DE | 102015201981 | 8/2016 |
| DE | 102016221694 | 5/2018 |

(Continued)

OTHER PUBLICATIONS

English machine translation of JP-2005001548-A (Year: 2005).*

(Continued)

*Primary Examiner* — John R Schnurr
(74) *Attorney, Agent, or Firm* — W. F. Fasse

(57) ABSTRACT

A method of performing a towing process by a towing vehicle (10) involves activating a towing mode (S1) and adapting a vehicle speed of the towing vehicle to a towing speed (S2). A camera system (100) for recognizing a towing process includes at least one camera (12) arranged on the rear of a vehicle, for detecting at least one sub-region located behind the vehicle, and an image processing device (16) configured to recognize a towing device (14) in detected image data, whereby a towing mode may be activated and/or terminated.

11 Claims, 2 Drawing Sheets

(56) References Cited

U.S. PATENT DOCUMENTS

2019/0016264 A1* 1/2019 Potnis ................. G06N 3/0454

FOREIGN PATENT DOCUMENTS

| DE | 102018100029 | | 7/2018 |
| DE | 102017203638 | | 10/2018 |
| JP | 2005001548 A | * | 1/2005 |

OTHER PUBLICATIONS

German Examiner Peter Christ, German Search Report for German Patent Application No. 10 2018 213 578.9, dated Apr. 18, 2019, 9 pages, German Patent and Trademark Office, Muenchen, Germany, with partial English translation, 6 pages.

* cited by examiner

METHOD FOR PERFORMING A TOWING PROCESS, AND CAMERA SYSTEM FOR RECOGNIZING A TOWING PROCESS, AS WELL AS MOTOR VEHICLE WITH A CAMERA SYSTEM

FIELD OF THE INVENTION

The invention relates to a method for performing a towing process, and to a camera system for recognizing a towing process, as well as to a motor vehicle with a camera system.

BACKGROUND INFORMATION

These days, it is no longer possible to imagine motor vehicles without driver assistance systems. Driver assistance systems have functions which support the driver of a vehicle when driving. In addition to increasing traffic safety, such systems also aim in particular to improve driver comfort and relieve driver stress. This is achieved in particular in that the system detects or records the environment and processes the detected information and then performs corresponding driving maneuvers or displays the environment information to the driver in a readily recognizable manner. Cameras are used in particular for this purpose which detect the space around the vehicle at least in regions. Known examples are front cameras, which are arranged in the region of the windshield and detect a region in front of the vehicle. The prior art also includes reversing cameras. These detect the region located behind the vehicle during reversing.

Although the vehicles are becoming technically ever more sophisticated and mature, it is entirely possible for a vehicle to break down at some point and then have to be towed away. In addition to the use of recovery vehicles, towing is often also performed by private individuals. This means, in particular, that a normal vehicle is used as the towing vehicle and tows the vehicle to be towed away using a rope. Since a towing scenario is not an everyday occurrence, the driver of the towing vehicle often finds the situation too much to handle and may easily behave inappropriately, which may consequently lead to dangerous situations. In particular, when the rope becomes taut and thus undergoes a severe jerk, it may happen that the driver of the towing vehicle carries out uncontrolled steering and/or braking interventions, which may endanger the traffic.

SUMMARY OF THE INVENTION

In view of the above, it is an object of the invention to provide an assistance function for the driver of a towing vehicle during a towing process, such that the towing process may proceed reliably and in a controlled manner, preventing the situation from becoming more awkward.

The above object can be achieved by a method, a camera system and a vehicle according to several aspects of the invention as set forth herein.

According to one first aspect, the present invention relates to a method for performing a towing process of a towing vehicle, having the steps of:

activating a towing mode,
adapting a vehicle speed to a towing speed.

One advantage of this is that a towing process takes place under controlled and prudent conditions, since handling or operation of the towing vehicle is automatically adapted to the present, generally unusual situation.

The towing speed may be a fixed speed. It is also possible, however, for the towing speed to be individually set by the driver of the towing vehicle. This has the advantage that towing vehicle drivers with towing experience can input a higher towing speed, while inexperienced vehicle drivers can set the towing speed to a lower value. It is advantageous for a maximum towing speed which must not be exceeded during towing mode to be predetermined, and in particular to be unmodifiable.

Adaptation of the towing speed may in particular take place in that the speed at which the towing vehicle is traveling at the time of activation of the towing mode is compared with the towing speed. If the vehicle speed is faster than the towing speed, then the speed at which the towing vehicle can advance is slowed down to the predefined value. If the speed is below the value of the towing speed, then the current speed is in particular maintained. It is also possible for the speed to be increased to the towing speed. This takes place in particular when the driver of the towing vehicle has previously been informed about it.

Activation of the towing mode may be communicated to the driver of the towing vehicle. This may be done optically and also acoustically.

In one advantageous configuration, the towing mode is activated with the assistance of a camera for detecting a region located behind the vehicle. The camera is in particular a reversing camera. In this case, the region located behind the vehicle is in particular detected using the camera, image data are generated and at least one towing means is recognized in the image data.

The towing means preferably comprise a tow rope. The tow rope is preferably flexible or bendable, such that it may sag or be slack, but additionally may also be taut.

To activate the towing mode of recognized towing means, the tow rope is preferably slack and/or sagging and/or mobile.

It is also conceivable that the towing mode may be activated by an input by the driver of the towing vehicle, wherein the input in particular proceeds through actuation of a button and/or a knob.

It is in principle also possible for the towing mode to be activatable by way of actuation of a hazard light button in the towing vehicle, in particular in combination with at least one further towing mode indicator. It is also conceivable for the towing mode to be activated from one of the vehicles involved by way of Car2Car communication.

It is advantageous if the towing mode is activated automatically. In this case, no deed or action is required of the driver of the towing vehicle.

In one preferred configuration, the towing mode is terminated automatically. This takes place in particular when a taut tow rope is recognized in the image data and/or when a predefined tractive force is detected which prevails at the towing means or tow rope.

After termination of the towing mode, the towing speed is preferably increased once again. After termination of the towing mode, the driver of the towing vehicle may then in principle drive the towing vehicle once again at a vehicle speed they desire.

It is advantageous for the driver of the towing vehicle to be informed during the towing process or at least during the presence of the towing mode about the state of the towing means. This may proceed in particular in that, at the latest on activation of the towing mode, the region detected by the camera, in particular at least one detected region comprising the towing means, is displayed on a display device. Display takes place at least until termination of the towing mode, preferably until the end of the towing process.

According to a second aspect, the invention relates to a camera system for recognizing a towing process, having at least one camera arranged on the rear of a vehicle for detecting at least one sub-region located behind the vehicle. The camera system additionally has an image processing device for analyzing image data, wherein the image processing device is configured in such a way as to recognize a towing means in the detected image data or the state of a towing means, whereby a towing mode may be activated and/or terminated.

The camera system according to the invention has the advantage of enabling maximally comfortable and safe towing. A driver of a towing vehicle may in this way be reliably informed during a towing process about the position of the towing means, thereby avoiding unpleasant surprises.

The state of the tow rope may be recognized or analyzed using the image processing device. The image processing device is preferably configured such that a slack and/or moving tow rope is recognized therewith, whereby a towing mode is activated, and/or a tight and/or taut tow rope is recognized, whereby the towing mode is terminated again.

The camera is advantageously a reversing camera. This constitutes an extension to the function of the reversing camera known from the prior art. As is clear from the name, the known reversing cameras are at present only used or active when a vehicle is reversing, in particular at a speed below a threshold value. If a vehicle is moving forwards, they are not active. In the camera system according to the invention, the reversing camera is also at least temporarily active when the vehicle is moving forwards and detects a region located behind the vehicle. It is conceivable that the reversing camera becomes active during forward travel only if a towing process is also present. In principle, the existence of a towing process can be automatically recognized, for example in that a force is applied to a motor vehicle tow hook. It is however also possible for a vehicle driver to activate the presence of a towing process manually. It is also conceivable that the reversing camera is by and large permanently active, for example in "snooze" mode, but only detects the surroundings during forward travel when a towing process is present.

The camera system preferably has at least one display device. In this way, the image captured by the camera, i.e. in particular the current position or the current state of the towing means, may be displayed to the driver of the towing vehicle. The driver of the towing vehicle is thus no longer surprised by the jerking load which accompanies tautening of the tow rope, so preventing inappropriate behavior.

In one preferred configuration, the camera system has a control unit. The control unit is configured such that it brings the vehicle speed into line with a towing speed, i.e. adjusts the vehicle speed in particular to a towing speed, after recognition of a towing means and in particular activation of a towing mode. The towing speed may be stored in the system or in a memory unit. It is also possible for the towing speed to be individually set by the driver of the towing vehicle. It is advantageous for a maximum towing speed to be predetermined by the system which cannot be exceeded, not even by an individual input.

The control unit is preferably configured such that it in particular compares the vehicle speed prevailing at the time of activation of the towing mode with the towing speed. If the vehicle speed is greater than the towing speed, i.e. the towing vehicle is moving faster than should be the case in the towing mode, then the control unit slows down the speed to the predefined value.

Furthermore, the control unit may be configured such that it increases the towing speed after termination of the towing mode, whereby the speed may once again be freely selectable or adjustable by the driver of the towing vehicle. The towing vehicle may then once again be driven at a speed predetermined by the driver of the towing vehicle.

In one preferred configuration, the camera system has a force sensor for measuring a tractive force in the towing means. In this way, a tractive force prevailing at the towing means, in particular at the tow rope, may be detected.

According to a third aspect, the present invention relates to a motor vehicle having a camera system according to the invention.

According to a fourth aspect, the present invention relates to use of a camera arranged on the rear of a motor vehicle, in particular a reversing camera, for recognizing a towing process.

BRIEF DESCRIPTION OF THE DRAWINGS

Further advantageous configurations are revealed by the drawings, in which.

DETAILED DESCRIPTION OF EXAMPLE EMBODIMENTS OF THE INVENTION

Figure 1:
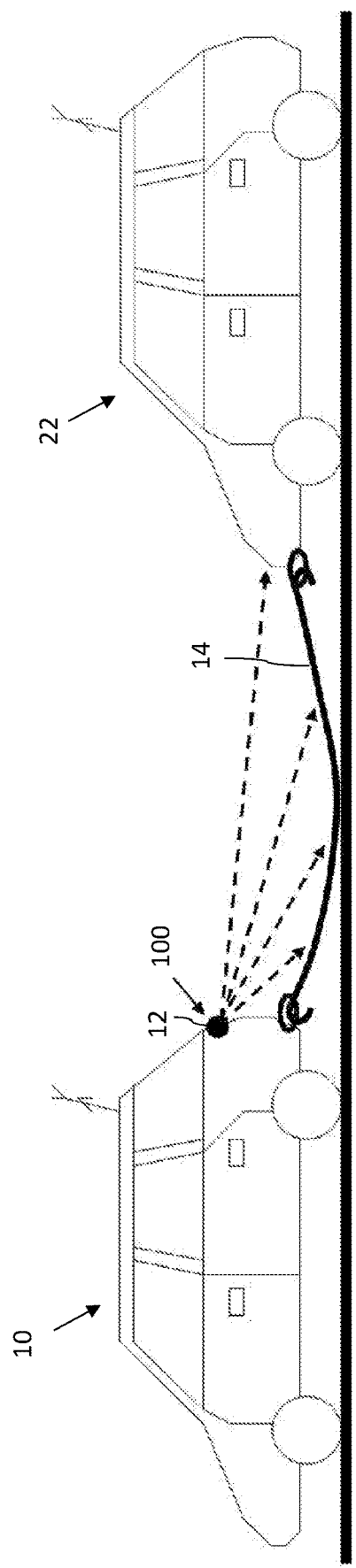
FIG. 1 is a schematic representation of a towing situation.

FIG. 1 shows a schematic representation of a towing situation. It shows a towing vehicle 10, which is towing another vehicle 22 by way of a towing means 14, in particular a tow rope. A camera system 100 with a camera 12 is arranged on the towing vehicle 10. The state of the tow rope can be recognized or analyzed by means of the camera system 100. As a function of the analysis of the state of the towing means 14, a towing mode is activated and/or deactivated or terminated. The camera 12 is preferably a reversing camera, which is at least temporarily active even during forward travel of the towing vehicle 10 and detects a region located behind the vehicle 10.

Figure 2:
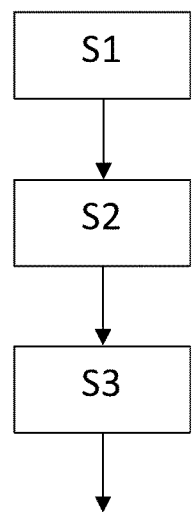
FIG. 2 is a schematic representation of a flow chart of a method according to the invention in one embodiment.

FIG. 2 shows a schematic representation of a flowchart of a method according to the invention for performing a towing process in one embodiment. In a first step S1 a towing mode is activated. Activation takes place in particular with the assistance of a camera 12, wherein a region located behind the vehicle 10 is detected by means of the camera 12, image data are generated and at least one towing means 14, in particular a slack tow rope, is recognized in the image data.

Once the towing mode has been activated, adaptation of the vehicle speed to a towing speed proceeds in a further step S2. The towing speed is in particular a fixed speed. Adaptation of the towing speed may in particular take place in that the speed at which the towing vehicle 10 is traveling at the time of activation of the towing mode is compared with the towing speed. If the vehicle speed is faster than the towing speed, then the speed at which the towing vehicle 10 can continue to move is slowed down from then on to the predefined value. This is shown in greater detail in FIG. 3.

In a further step S3 the towing mode may be automatically terminated. This takes place in particular when a taut tow rope is recognized in the image data and/or when a predefined tractive force is detected which prevails at the towing means or tow rope. After termination of the towing mode, the towing speed may be increased once again and the driver of the towing vehicle can decide freely about the speed at which they drive.

Figure 3:
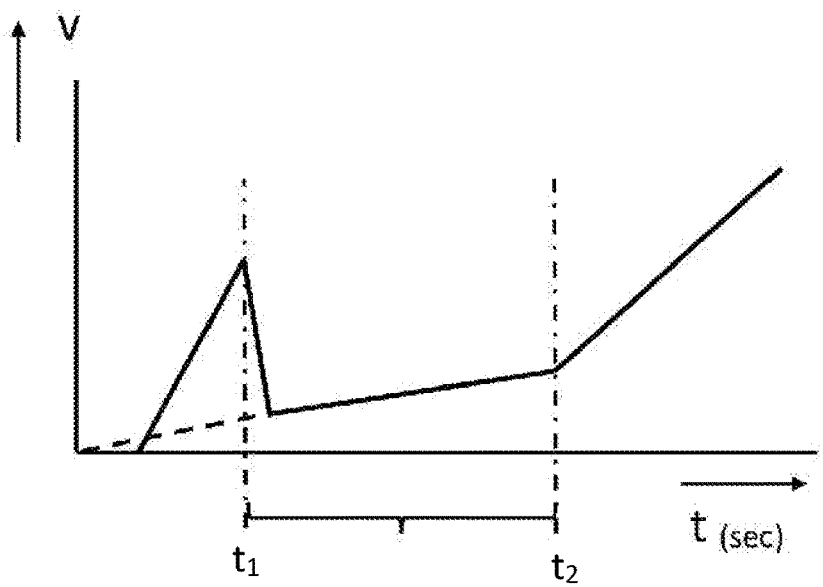
FIG. 3 is a schematic representation of speed profile of a towing vehicle during a towing process in one configuration.

FIG. 3 shows a schematic representation of a speed profile of a towing vehicle 10 during a towing process in one configuration. At a time t1 a towing mode is activated. The speed of the towing vehicle 10 is here above a predefined towing speed. The speed is consequently slowed down to a towing speed. After termination of the towing mode, which is present at time t2, the towing speed is increased once again and the driver of the towing vehicle can once again decide their speed for themselves.

Figure 4:
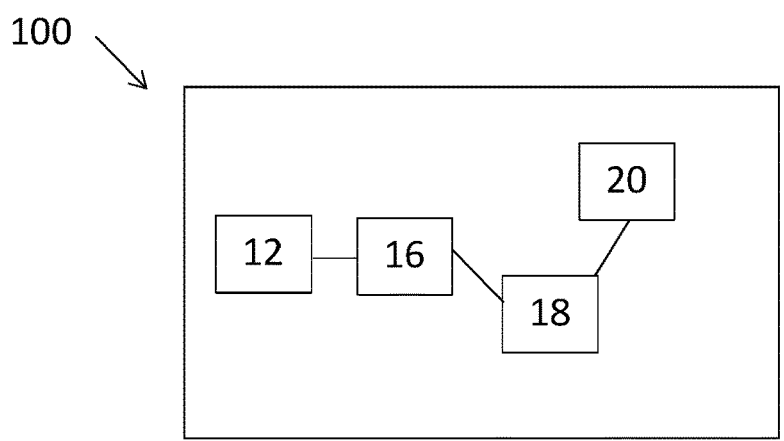
FIG. 4 is a schematic representation of a camera system according to the invention in one embodiment.

FIG. 4 shows a schematic representation of a camera system 100 according to the invention for recognizing a towing process in one embodiment. The camera system 100 comprises at least one camera 12 arranged on the rear of a vehicle, in particular a reversing camera, for detecting at least one sub-region located behind the vehicle 10. In addition, the camera system 100 comprises an image processing device 16, which is configured such that it recognizes a towing means 14 in the detected image data, whereby a towing mode may be activated and/or terminated. The camera system further comprises a control unit 18, which is configured such that it brings a vehicle speed into line with a towing speed after recognition of a towing means 14. To be able to determine a tractive force prevailing in the towing means 14, the camera system 100 may further comprise a force sensor 20.

The invention has been described above with reference to exemplary embodiments. It goes without saying that numerous amendments and modifications are possible without thereby going beyond the scope of protection defined by the claims. A combination of the various exemplary embodiments is also possible.

LIST OF REFERENCE SIGNS

10 Towing vehicle
12 Camera
14 Towing means
16 Image processing device
18 Control unit
20 Force sensor
22 Vehicle to be towed
100 Camera system
S1-S3 Method steps

The invention claimed is:

1. A method of performing a towing process by a towing vehicle, comprising the steps:
using a reversing camera of the towing vehicle, detecting a region located behind the towing vehicle and generating corresponding image data;
in the image data, recognizing a tow rope that is slack and/or moving;
in response to the recognizing of the tow rope that is slack and/or moving, activating a towing mode; and
after the activating of the towing mode, automatically adapting a vehicle speed of the towing vehicle to a specified towing speed.

2. The method according to claim 1, further comprising terminating the towing mode when at least one of the following situations is present:
recognizing in the image data that the tow rope is tight or taut, or
detecting a predefined tractive force on the tow rope.

3. The method according to claim 2, wherein, after termination of the towing mode, the vehicle speed is increased and a driver of the towing vehicle is enabled to drive the towing vehicle at any desired value of the vehicle speed.

4. The method according to claim 2, wherein the terminating of the towing mode occurs in response to the recognizing that the tow rope is tight or taut.

5. The method according to claim 2, wherein the terminating of the towing mode occurs in response to the detecting of the predefined tractive force on the tow rope.

6. The method according to claim 1, wherein the step of recognizing comprises recognizing that the tow rope is slack.

7. The method according to claim 1, wherein the step of recognizing comprises recognizing that the tow rope is moving.

8. A system for performing a towing process by a towing vehicle, comprising:
a reversing camera that is arranged at a rear of the towing vehicle and is configured to detect a region located behind the towing vehicle and to generate corresponding image data;
an image processing device configured to recognize, in the image data, a tow rope that is slack and/or moving; and
a control unit configured to activate a towing mode in response to the recognizing of the tow rope that is slack and/or moving, and, after the activating of the towing mode, to automatically adapt a vehicle speed of the towing vehicle to a specified towing speed.

9. The system according to claim 8, further comprising a force sensor configured to measure a tractive force on the tow rope.

10. A motor vehicle having a system according to claim 8.

11. A method of recognizing a towing process by a towing vehicle, comprising the steps:
using a reversing camera of the towing vehicle, detecting a region located behind the towing vehicle and generating corresponding image data;
in the image data, recognizing a tow rope that is slack and/or moving;
in response to the recognizing of the tow rope that is slack and/or moving, recognizing that the towing vehicle is performing the towing process.

* * * * *